United States Patent
Qu et al.

(10) Patent No.: US 9,487,243 B2
(45) Date of Patent: Nov. 8, 2016

(54) VEHICLE BODY STRUCTURE

(71) Applicant: Ford Global Technologies, LLC, Dearborn, MI (US)

(72) Inventors: Yi Qu, Troy, MI (US); Michael Luchtman, Clawson, MI (US); Chris Stephen O'Connor, Livonia, MI (US); John Michael McGuckin, Ann Arbor, MI (US); Randall R. Frank, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 90 days.

(21) Appl. No.: 14/620,236

(22) Filed: Feb. 12, 2015

(65) Prior Publication Data

US 2016/0159406 A1    Jun. 9, 2016

Related U.S. Application Data

(60) Provisional application No. 62/089,679, filed on Dec. 9, 2014.

(51) Int. Cl.
 *B62D 25/02* (2006.01)
 *B62D 25/20* (2006.01)
 *B62D 29/00* (2006.01)

(52) U.S. Cl.
 CPC ......... *B62D 25/2036* (2013.01); *B62D 25/025* (2013.01); *B62D 29/007* (2013.01)

(58) Field of Classification Search
 CPC ............ B62D 25/025; B62D 25/2036; B62D 29/007
 USPC .................................................... 296/193.02
 See application file for complete search history.

(56) References Cited

U.S. PATENT DOCUMENTS

| | | | |
|---|---|---|---|
| 5,921,618 A | 7/1999 | Mori et al. | |
| 6,604,781 B2 | 8/2003 | Uchida | |
| 7,306,281 B2 | 12/2007 | Kobayashi et al. | |
| 7,644,978 B2 | 1/2010 | Tosaka et al. | |
| 8,419,115 B2 * | 4/2013 | Tamura | B62D 25/16 296/198 |
| 8,567,857 B2 * | 10/2013 | Fujii | B60R 22/023 296/193.05 |
| 8,662,574 B2 | 3/2014 | Mildner et al. | |
| 8,789,875 B2 | 7/2014 | Kageyama | |
| 9,045,165 B2 * | 6/2015 | Kurokawa | B62D 25/02 |
| 2007/0284914 A1 | 12/2007 | Schiebel et al. | |
| 2013/0049405 A1 * | 2/2013 | Kurogi | B62D 25/04 296/203.01 |
| 2015/0003898 A1 * | 1/2015 | Shiozaki | B62D 27/023 403/267 |

FOREIGN PATENT DOCUMENTS

| | | | | |
|---|---|---|---|---|
| EP | 2096020 A1 * | 9/2009 | ......... | B62D 21/157 |
| FR | 2922509 A1 * | 4/2009 | ......... | B62D 25/025 |
| JP | 2003095130 | 4/2003 | | |
| JP | 2007091160 | 4/2007 | | |
| JP | EP 2006191 A1 * | 12/2008 | ......... | B62D 21/157 |
| JP | WO 2012098630 A1 * | 7/2012 | ......... | B62D 25/025 |
| JP | WO 2013145232 A1 * | 10/2013 | ............ | B62D 25/20 |
| KR | 20120029878 | 3/2012 | | |

* cited by examiner

*Primary Examiner* — H Gutman
(74) *Attorney, Agent, or Firm* — Jason Rogers; Bejin Bieneman PLC

(57) ABSTRACT

A vehicle body structure includes a side sill formed of high strength steel and a seat cross-member formed of high strength steel. A floor pan is welded to at least one of the side sill and the seat cross-member. A flange includes a base extending from the seat cross-member and a tab extending from the base. The tab is spaced from the seat cross-member and is welded to the floor pan and the side sill.

20 Claims, 3 Drawing Sheets

VEHICLE BODY STRUCTURE

CROSS-REFERENCE TO RELATED APPLICATIONS

The subject patent application claims priority to and all the benefits of U.S. Provisional Patent Application No. 62/089,679 filed on Dec. 9, 2014, which is herein incorporated by reference in its entirety.

BACKGROUND

A body structure of a vehicle includes a pair of side sills, positioned on the right side and left side of the vehicle, seat cross-members extending between the side sills, and a floor pan extending beneath the seat cross-members between the side sills. The seat cross-members are welded to the side sills and are welded to the floor pan. The floor pan is welded to the side sills. A weld span without welds between the side sills and the floor pan exist along the seat cross-members. In other words, the seat cross-members restrict access to the interface between the side sills and the floor pan along the seat cross-members, such that no welds are made between the side sills and the floor pan along the seat cross-members. This weld span without welds along the seat cross-members may be between 165-185 mm.

During vehicle crash testing, e.g., small offset rigid barrier tests, side impact tests, etc., the welds between the floor pan and the side sills are subjected to forces. The welds between the floor pan and the side sills adjacent the seat cross-members may be subjected to the highest forces and, as such, a higher opportunity for separation between the floor pan and the side sills may occur in this area during crash testing. When the side sills and the seat cross-members are formed of mild steel, the mild steel may be stamped and trimmed in ways to increase the interaction and welds between the side sills and the floor pan in the area of the seat cross-members to reduce the possibility of separation between the floor pan and the side sills during crash testing.

High strength steels are being used increasingly in the formation of the side sills and the seat cross-members. The material characteristics of the high strength steel allows the side sills and the floor pan formed of high strength steel to be thinner, i.e., lower gage, than the same side sills and floor pan made from mild steel. As such, the use of high strength steel allows for the side sills and floor pan to be made thinner, and thus lighter, to aid in improving fuel economy of the vehicle. However, high strength steel is less workable than mild steel. As such, there remains an opportunity to design a body structure having side sills and seat cross-members formed of high strength steel and that reduces the possibility of separation between the floor pan and the side sills during crash testing.

DETAILED DESCRIPTION

Figure 1:
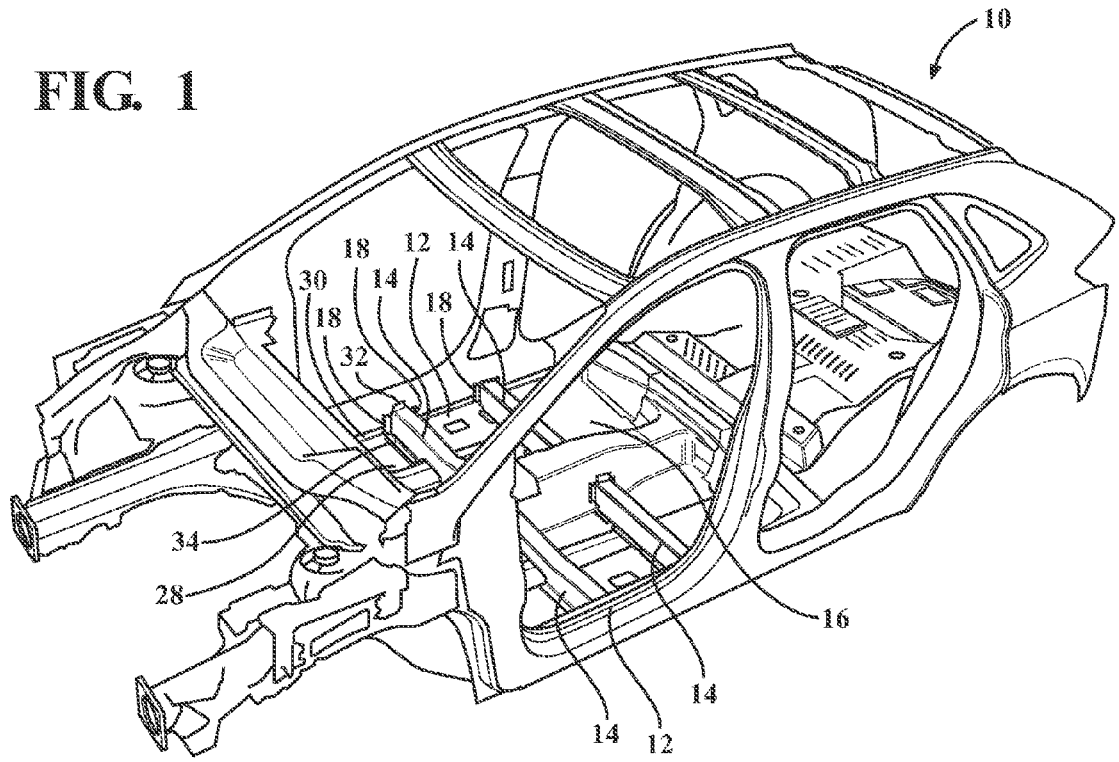
FIG. 1 is a perspective view of a body structure of a vehicle including a seat cross-member and a seat pan welded to side sills.

With reference to the Figures, wherein like numerals indicate like parts throughout the several views, a first embodiment of a body structure 10 of a vehicle is shown in FIGS. 1-4. The body structure 10 includes a side sill 12 formed of high strength steel, a seat cross-member 14 formed of high strength steel, and a floor pan 16 welded to at least one of the side sill 12 and the seat cross-member 14. A flange 18 includes a base 20 extending from the seat cross-member 14 and a tab 22 extending from the base 20. The tab 22 is spaced from the seat cross-member 14 and is welded to the floor pan 16 and the side sill 12.

Since the tab 22 is welded to the floor pan 16 and the side sill 12, this configuration advantageously reinforces the connection between the floor pan 16 and the side sill 12. In particular, the increased number of welds 24 and the location of the weld 24 that is located on the flange 18 reduces the weld-less span along the seat cross-members 14 to increase the strength of the connection between the floor pan 16 and the side sill 12. This reduces the likelihood of separation of the floor pan 16 and side sill 12 during crash tests of the vehicle, e.g., high speed offset crash tests such as small offset rigid barrier (SORB) tests, side impact tests, etc.

With reference to FIG. 1, the body structure 10 may include a pair of side sills 12 spaced from each other. The side sills 12 may extend longitudinally between a front of the vehicle and a rear of the vehicle. One of the side sills 12 may be positioned along a left side of the vehicle and the other of the side sills 12 may be positioned along a right side of the vehicle. The floor pan 16 may extend from one side sill 12 to the other side sill 12 and may be welded to both side sills 12. The side sills 12 may have a tubular cross-section, as shown in FIGS. 2-4.

With continued reference to FIG. 1, the body structure 10 may include two seat cross-members 14. However, it should be appreciated that the body structure 10 may include any suitable number of seat cross-members 14. Only one end of the seat cross-members 14 is shown in the Figures, however, it should be appreciated that each seat cross-member 14 may extend from one side sill 12 to the other side sill 12. In such a configuration, the ends of the seat cross-member 14 may be mirror images of each other to be welded to both of the two seat cross-members 14.

Each end of the seat cross-member 14 may include a pair of flanges 18, as shown in FIG. 1, spaced from each other along the side sill 12 on opposite sides of the seat cross-member 14. These flanges 18 may be mirror images of each other.

Figure 2:
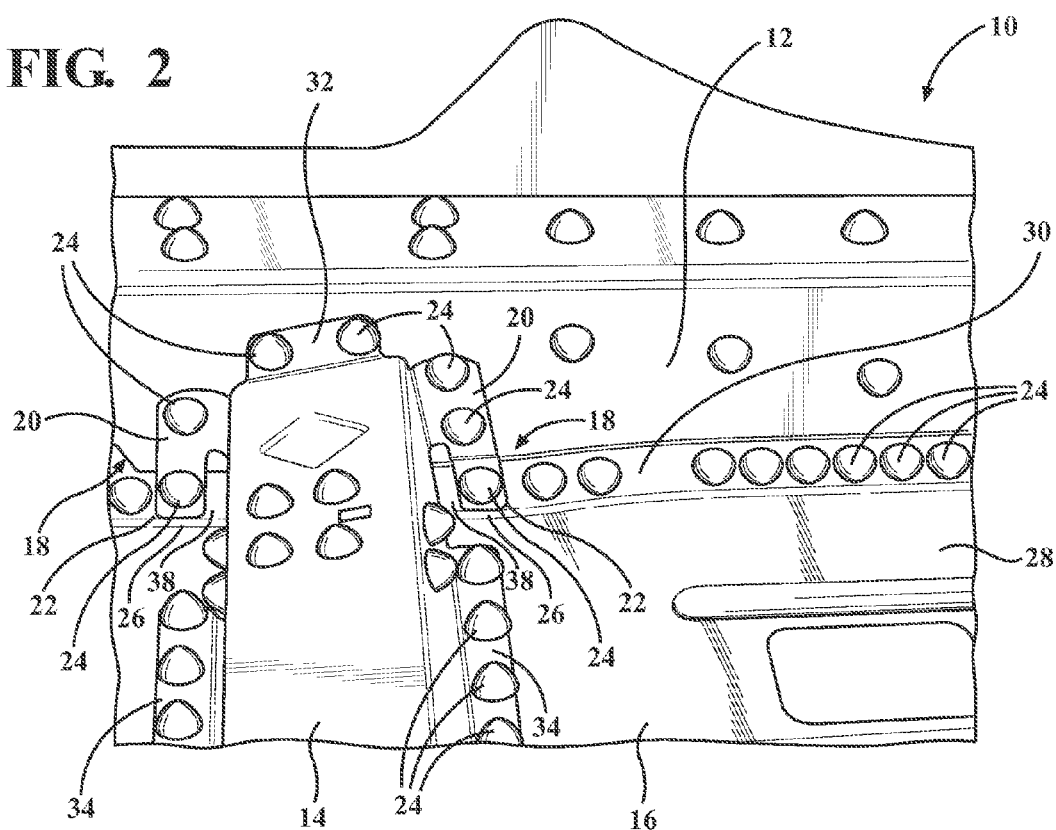
FIG. 2 is perspective view of a portion of the body structure including the seat cross-member and the seat pan welded to one of the side sills.
Figure 3:
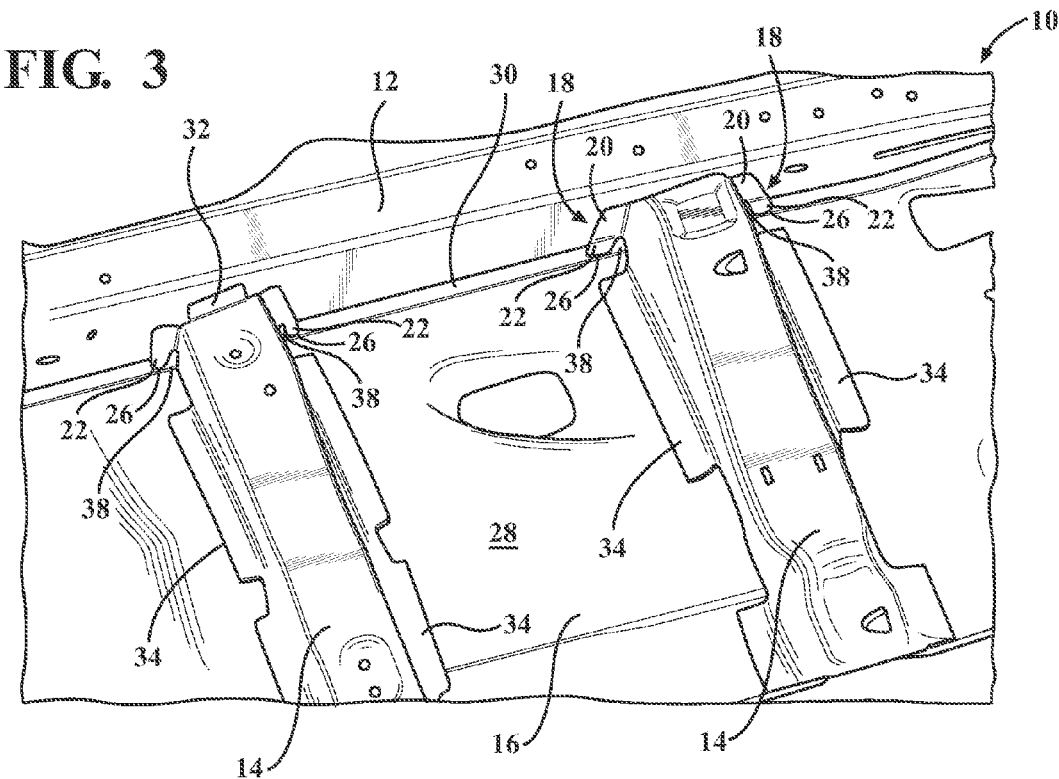
FIG. 3 is a perspective view of a portion of the body structure before welding.
Figure 4:
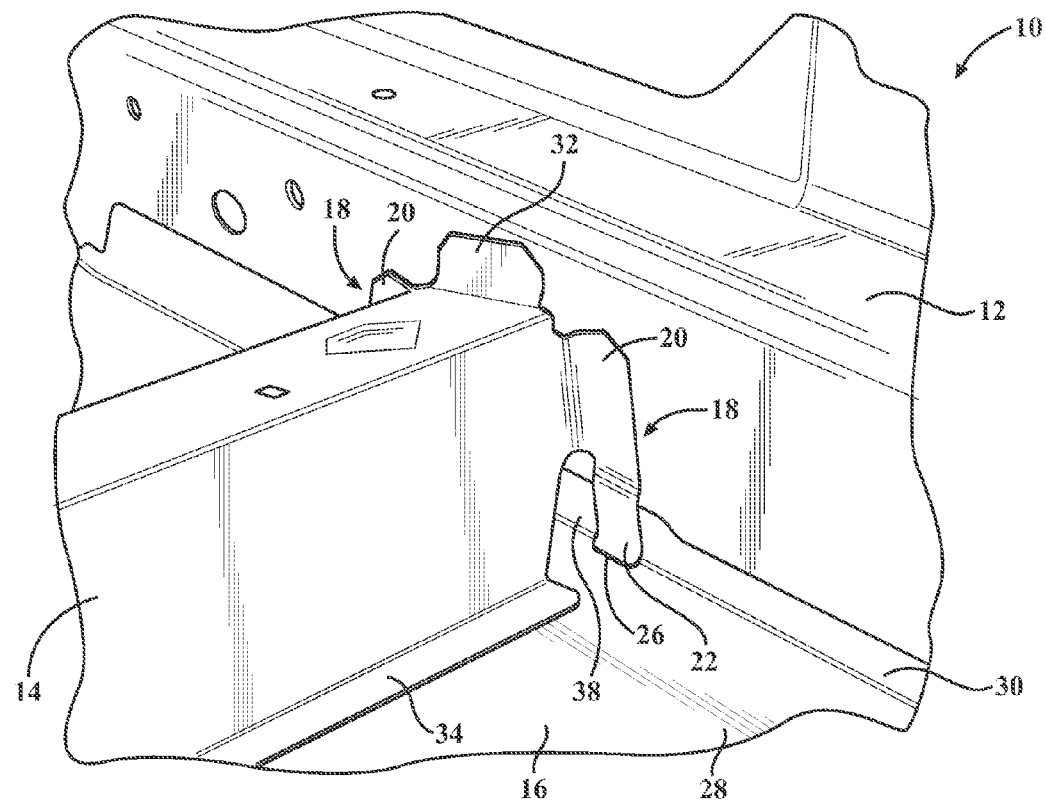
FIG. 4 is another perspective view of a portion of the body structure before welding.

With reference to FIGS. 2-4, the floor pan 16 is disposed between the tab 22 and the side sill 12. As such, the floor pan 16 is welded between the tab 22 and the side sill 12, as shown in FIG. 2. This configuration advantageously pinches the floor pan 16 between the side sill 12 and the tab 22 to reinforce the connection between the floor pan 16 and the side sill 12.

The base 20 of the flange 18 may abut the side sill 12. As shown in FIG. 1, the base 20 of the flange 18 may be welded to the side sill 12.

The flange 18 may be formed of the same type of material as the seat cross-member 14. The flange 18 may integrally formed with the seat cross-member 14. In other words, the flange 18 may be formed simultaneously with the seat cross-member 14 as a single continuous unit. Specifically, the seat cross-member 14 and the flange 18 may be formed from a single piece of material that is stamped and trimmed with dies. Alternatively, the flange 18 may be formed separately from the cross-member 14 and subsequently fixed to the cross-member 14.

With reference to FIGS. 2-4, the tab 22 extends from the base 20 to an end 26 spaced from the base 20. A gap 38 is defined between the tab 22 and the seat cross-member 14. The gap 38 may extend along the flange 18 from the base 20 to the end 26. The end 26 of the tab 22 is cantilevered relative to the base 20. The tab 22 is welded to the floor pan 16 between the base 20 and the end 26 of the tab 22. The tab 22, for example, may extend 15-18 mm from the base 20.

The floor pan 16 may define a bottom 28 and a lip 30 extending from the bottom 28. The lip 30 may be welded to the side sill 12 at welds 24, as shown in FIG. 2. The lip 30 may extend upwardly at a right angle relative to the bottom 28, as shown in FIGS. 1-4. It should be appreciated that the floor pan 16 may include one or more lips 30 welded to any number of side sills 12.

The side sills 12 and/or the seat cross-member 14 may be formed of a type of metal that is stronger than a type of metal of the floor pan 16. For example, the type of metal of the side sills 12 and/or the seat cross-member 14 may have a higher yield strength and/or higher toughness than the type of metal of the floor pan 16. As set forth further below, since the lip 30 of the floor pan 16 is pinched and welded between one of the side sills 12 and flange 18, the stronger type of material of the floor pan 16 and/or the flange 18 reinforces the floor pan 16.

The floor pan 16 may be formed of mild steel, e.g., low carbon formable steel, coated or uncoated, hot or cold-rolled steel, with yield strength less than 240 MPa (35 ksi) (grade levels of low carbon sheet steels may be classified by SAE J2329 document). As one example, the floor pan 16 may be formed of CR 210 steel. Alternatively, the floor plan 16 may be formed of any suitable type of steel. The floor pan 16 may be 0.6-0.7 mm thick, e.g., 0.67 mm thick. The thickness of the seat floor pan 16 may be constant.

As set forth above, the side sills 12 may be formed of high-strength steel e.g., steel that is hot or cold-rolled sheet, uncoated or coated, with yield strength equal or greater than 240 MPa (35 ksi) (the grades (SAE J2340) and strength levels may be achieved through chemical composition and special processing). For example, the side sills 12 may be formed of dual phase steel. As one example, the side sills 12 may be formed of DP 600 steel. Alternatively, the side sills 12 may be formed of any suitable type of steel. The side sills 12, for example, may be 1.25-1.75 mm thick, e.g., 1.5 mm thick. The thickness of the side sills 12 may be constant.

The seat cross-member 14 and the flanges 18 may be formed of high-strength steel. For example, the seat cross-members 14 and the flanges 18 may be formed of dual phase steel. As one example, the seat cross-members 14 and the flanges 18 may be formed of DP 780 steel. As another example, the seat cross-members 14 and the flanges 18 may be formed of a high-strength low alloy steel, such as HSLA 300 steel. Alternatively, the seat cross-members 14 and the flanges 18 may be formed of any suitable type of steel.

The seat cross-member 14 and the flanges 18 may have a common thickness. The thickness of the seat cross-member 14 and the flange 18 may be constant. The seat cross-member 14 and the flanges 18, for example, may be between 1.0-1.3 mm thick. For example, the seat cross-members 14 and the flanges 18 may be formed of DP 780 steel that is 1.1 mm thick. As another example, the seat cross-members 14 and the flanges 18 may be formed of HSLA 300 steel that is 1.2 mm thick.

The seat cross-members 14 may include another flange 32 welded to the side sill 12. The flange 32 may be elongated along a longitudinal direction of the side sill 12 and the line of welds 24 along the flange 32 may extend along the longitudinal direction of the side sill 12. The seat cross-members 14 may include longitudinal flanges 34 extending along the floor pan 16 and welded to the floor pan 16. The flanges 32, 34 may be integrally formed with the rest of the seat cross-member 14.

With reference to FIG. 1, the welds 24 between the floor pan 16, seat cross-members 14, side sills 12, and flange 18 may be spot welds. The spot welds may be 3T welds.

In operation, the weld 24 at the tab 22 of the flange 18 pinches the lip 30 of the floor pan 16 between the tab 22 and the side sill 12. The tab 22 and the side sill 12, being formed of a type of metal stronger than the type of metal of the floor pan 30, reinforce the lip 30 of the floor pan 16 to assist in limiting and/or preventing separation between the side sill 12 and the floor pan 16 during a vehicle collision, e.g., a SORB test, side-impact test, etc. During such a vehicle collision, the shear force on the weld 24 at the tab 22 is more than two times higher than the shear force on the adjacent weld 24. This weld 24 at the tab 22 resists this shear force to assist in limiting and/or preventing separation between the side sill 12 and the floor pan 16 during the vehicle collision.

Figure 5:
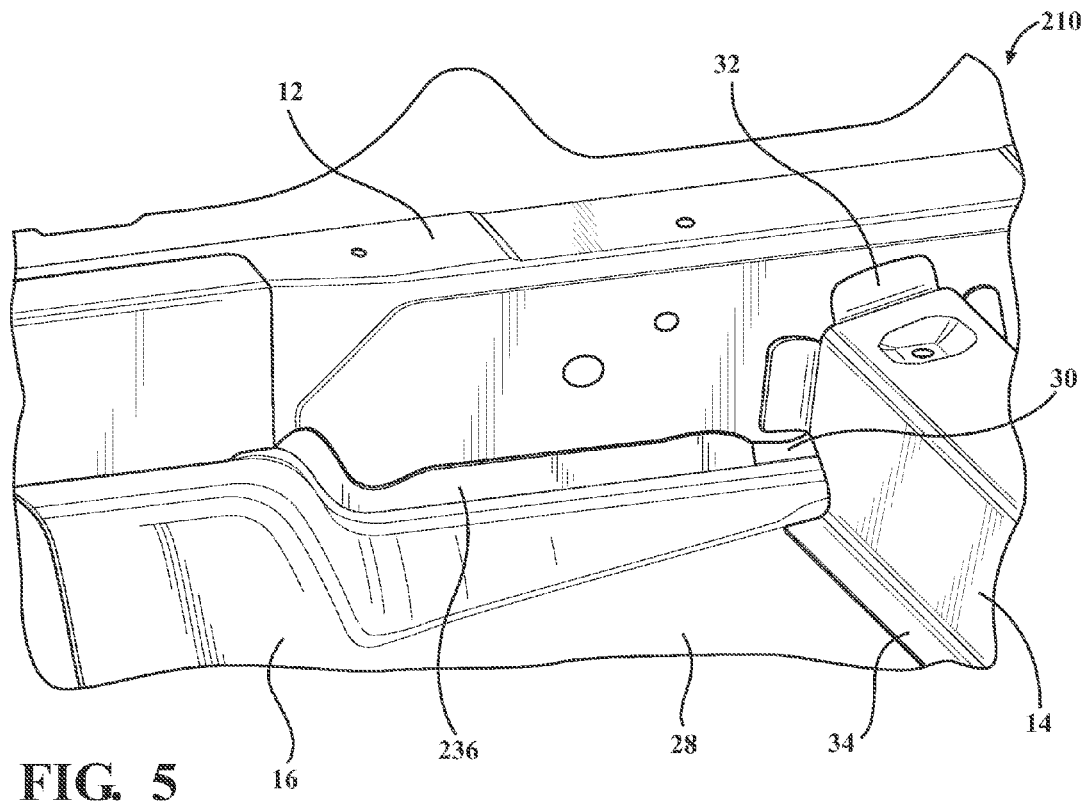
FIG. 5 is a perspective view of a second embodiment of the body structure.

A second embodiment of the body structure 210 is shown in FIG. 5. The second embodiment of the body structure 10 includes a flange reinforcement 236 welded to the lip 30 of the floor pan 16 and the side sill 12. The lip 30 of the floor pan 16 may be disposed between the flange reinforcement 236 and the side sill 12. The flange reinforcement 236 effectively increases the width of the lip 30 to assist in limiting and/or preventing separation between the side sill 12 and the floor pan 16 during a vehicle collision. The flange reinforcement 236 may be, for example, formed of high-strength low alloy steel. As one example, the flange reinforcement 236 may be formed of HSLA 340 and may be 1.0 mm thick.

Figure 6:
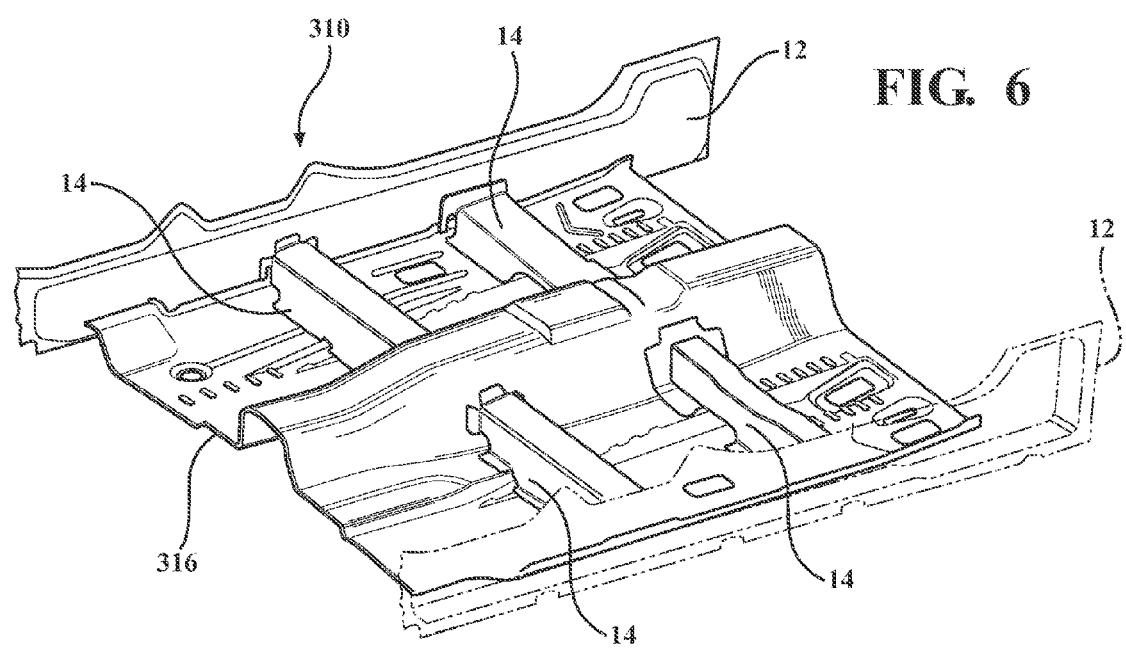
FIG. 6 is a perspective view of a third embodiment of the body structure.

A third embodiment of the body structure 310 is shown in FIG. 6. In the third embodiment, the thickness of the floor pan 316 is 1.0-1.5 mm thick, e.g., 1.25 mm thick. In such an embodiment, the floor pan 316 may be formed of mild steel and the increased thickness of the floor pan 316 assists in limiting and/or preventing separation between the side sill 12 and the floor pan 16 during a vehicle collision The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:
1. A vehicle body structure comprising:
a side sill formed of high strength steel;
a seat cross-member formed of high strength steel; and
a floor pan welded to at least one of the side sill and the seat cross-member;
a flange including a base extending from the seat cross-member and a tab extending from the base, the tab being spaced from the seat cross-member and welded to the floor pan and the side sill.

2. The vehicle body structure as set forth in claim 1 wherein the floor pan is disposed between the tab and the side sill.

3. The vehicle body structure as set forth in claim 1 wherein the base of the flange is welded to the side sill.

4. The vehicle body structure as set forth in claim 1 wherein the flange is integrally formed with the seat cross-member.

5. The vehicle body structure as set forth in claim 1 wherein the tab extends from the base to an end spaced from the base.

6. The vehicle body structure as set forth in claim 5 wherein the tab is welded to the floor pan between the base and the end of the tab.

7. The vehicle body structure as set forth in claim 5 wherein the end of the tab is 15-18 mm from the base.

8. The vehicle body structure as set forth in claim 1 wherein the floor pan is formed of mild steel.

9. The vehicle body structure as set forth in claim 1 wherein the floor pan is formed of cold rolled steel.

10. The vehicle body structure as set forth in claim 1 wherein the floor pan is 0.6-0.7 mm thick.

11. The vehicle body structure as set forth in claim 1 wherein the side sill is formed of dual phase steel.

12. The vehicle body structure as set forth in claim 1 wherein the side sill is 1.25-1.75 mm thick.

13. The vehicle body structure as set forth in claim 1 wherein the seat cross-member is formed of dual phase steel.

14. The vehicle body structure as set forth in claim 1 wherein the seat cross-member is formed of high-strength low alloy steel.

15. The vehicle body structure as set forth in claim 1 wherein the seat cross-member is 1.0-1.3 mm thick.

16. The vehicle body structure as set forth in claim 1 wherein the side sill and the seat cross-member are formed of dual phase steel.

17. The vehicle body structure as set forth in claim 1 wherein the floor pan is 0.6-0.7 mm thick, the side sill is 1.25-1.75 mm thick, and the seat cross-member is 1.0-1.3 mm thick.

18. The vehicle body structure as set forth in claim 1 wherein the floor pan is formed of mild steel, and wherein the side sill and the seat cross-member are formed of dual phase steel.

19. The vehicle body structure as set forth in claim 1 wherein the flange is formed from the same type of material as the seat cross-member.

20. A vehicle body structure comprising:
a side sill formed of high strength steel and being 1.25-1.75 mm thick;
a seat cross-member formed of high strength steel and being 1.0-1.3 mm thick; and
a floor pan formed of mild steel and being 0.6-0.7 mm thick and being welded to at least one of the side sill and the seat cross-member;
a flange integrally formed with the seat cross-member, the flange including a base extending from the seat cross-member and a tab extending from the base, the tab being spaced from the seat cross-member and welded to the floor pan and the side sill.

\* \* \* \* \*